UNITED STATES PATENT OFFICE.

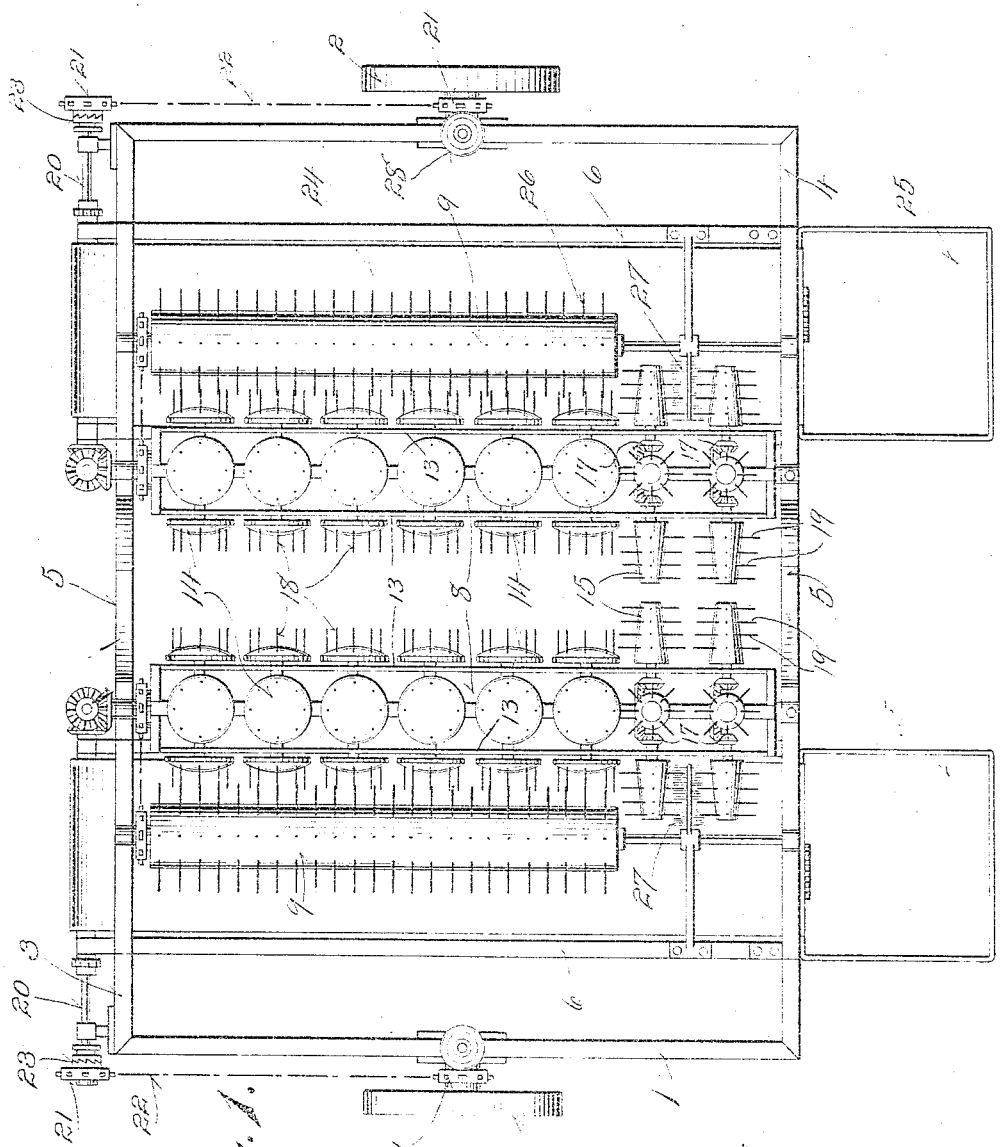

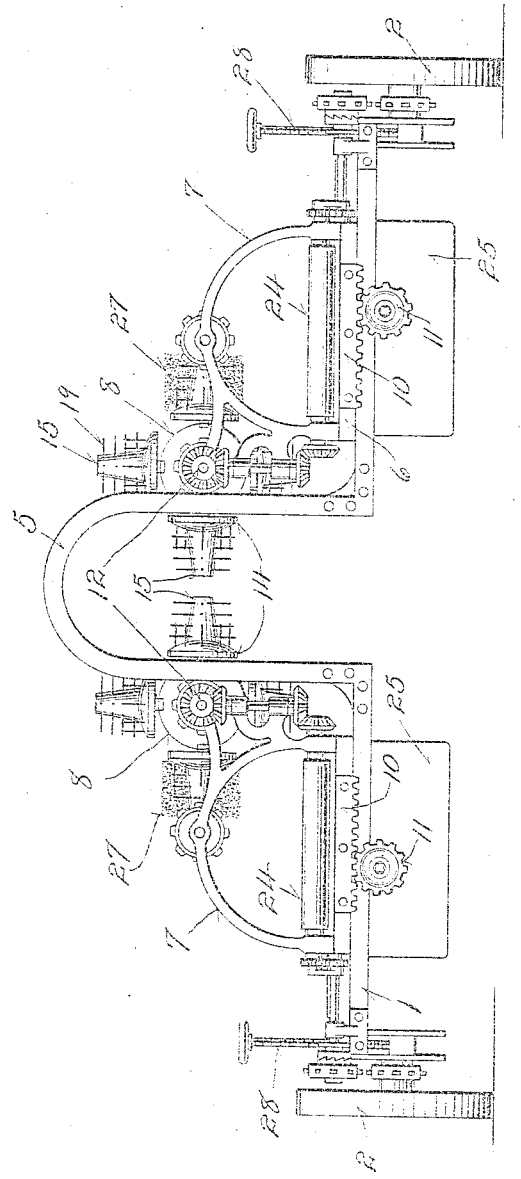
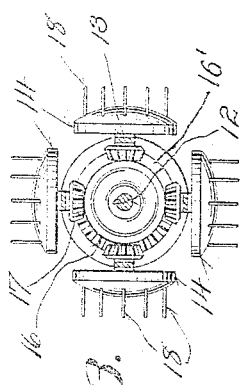

THOMAS M. OLSON, OF HUDSON, WISCONSIN.

COTTON-PICKER.

1,283,277.  Specification of Letters Patent.  Patented Oct. 29, 1918.

Application filed December 26, 1917. Serial No. 208,773.

*To all whom it may concern:*

Be it known that I, THOMAS M. OLSON, a citizen of the United States, and resident of Hudson, in the county of Saint Croix and State of Wisconsin, have invented certain new and useful Improvements in Cotton-Pickers; and I do hereby declare that the following is a full, clear, and exact description thereof.

My invention refers to new and useful improvements in harvesting machines, particularly to machines for picking cotton.

Although there are such machines at present in use, the majority of them are ineffective in operation, and therefore it is the object of this invention to produce a simply constructed machine which will be much more effective and thorough in operation than those machines of like nature.

In carrying out this general object of the invention certain parts found in ordinary machines have been rearranged to make the apparatus more effective, for instance the usual elongated harvesting members, or picking rolls are arranged horizontally, they previously having been disposed vertically. It has been found that this produces a much more effective machine.

The present invention also aims to provide means for adjusting the various parts of the machine, that is to say, the harvesting members are both movable toward and away from each other and vertically movable with respect to the ground.

A still further minor object is to provide an improved arrangement for removing the picked cotton from the harvesting members preparatory to conveying the same to suitable receptacles carried by the machine.

With these and other objects and advantages in view the invention resides in certain novel features of construction, combination and arrangement of parts which will be hereinafter more particularly described and claimed and shown in the drawings, wherein;

Figure 1 represents a plan view of a machine constructed in accordance with the invention.

Fig. 2 is a front elevational view of the parts shown in Fig. 1, and

Fig. 3 is a detail transverse sectional view through one of the harvesting members.

As is usual in this type of machine the same comprises a supporting frame 1 mounted upon suitable ground engaging wheels 2. In this preferred construction the frame 1 is rectangular in plan view as will appear from Fig. 1, and the front and rear bars 3 and 4 respectively are provided with centrally disposed upwardly extending arches 5 between the sides of which the cotton plants are positioned. The picking fingers of the harvesting members are obviously adapted to project into the center line of these arches to remove the bolls of cotton from the plants.

Carried by the main supporting frame 1 is a pair of supplemental frames 6, one of which is disposed on each side of the arches 5, and each is constructed in substantially the same manner as the other. In plan view frames 6 are rectangular and comprise end brackets 7 for journally mounting harvesting members and cleaning rolls 8 and 9 respectively The ends of the supplemental frames 6 rest upon the bars 3 and 4 of the frame 1 and are adapted to slide longitudinally thereof, they being moved by the racks and pinions 10 and 11 respectively as shown clearly in Fig. 2. From Fig. 2 it will be seen that each of the supplemental frames carries a rack 10 and that a pair of pinions 11 are journally mounted on the main supporting frame 1, one of these pinions being disposed on each side of the arches 5. Any suitable means may be used for rotating the pinions, for instance in the present embodiment a wrench may be disposed on the squared ends of the stub shafts on which they are carried by the frame 1.

Each of the harvesting members 8 comprises a stationary shaft 12 carried by the brackets 7, an elongated frame formed of a number of slats 13 and a plurality of rotatable picking members 14 and 15 carried by the frame. Said frame is mounted to revolve about the stationary shaft 12 in a manner to be hereinafter more particularly described. Each picking member is mounted to revolve on an axis radially disposed to the axis of rotation of the frame. The latter movement is carried out by means of semi-circular racks carried by rings 16', secured to the stationary shaft 12 and disposed adjacent each set of picking members, said racks and rings being engaged by pinions 17 on the shafts of the picking members which extend through the slats 13.

Two forms of picking members are preferably used, those disposed throughout the majority of the length of the harvesting members being in the form of substantially flat circular disks from the outer face of each of which an annular series of picking fingers 18 project. These picking fingers initially act upon the cotton plants, and it will be noted from Fig. 1 that the ends of the fingers 18 on the opposite harvesting members are spaced a considerable distance apart. These fingers remove the cotton from the upper portions of the plants. The other forms 15 of picking members are fewer in number and are positioned at the rear ends of the harvesting members, these members 15 being in the form of arms from which picking fingers 19 radially project. The arms 15 being longer than the disk-like picking members 14, extend farther toward each other as shown in Fig. 1 and therefore, engage a greater portion of the cotton plants.

The picking members 14 are adapted to be rotated transversely or at right angles to the direction of rotation of the frames composing the harvesting members 8 by the semi-circular racks 16 as clearly shown in Fig. 3. These racks 16 are so arranged that the break between their ends is adjacent the cleaning rolls 9. The direct result of this disposition of the racks is that the picking members 14 will only be revolved while in the path of movement of the cotton plants. In other words as the picking members 14 successively move into engagement with the fingers of the cleaning rolls 9 their rotation ceases so that the picking fingers and the cleaning fingers will not be injured. The picking members 15, on the other hand, not being in engagement with the fingers of the cleaning rolls 9 are adapted to continuously revolve throughout the path of rotative movement of the harvesting members 8. Fig. 1 clearly shows the relation of the last mentioned picking members with respect to the cleaning rolls 9.

The harvesting members 8 are adapted to be rotated by the rotation of the wheels 2 to which they are connected by suitable connections including the extensible shafts 20, sprockets 21, and sprocket chains 22. Clutches 23 are arranged to intermittently connect the shafts with the wheels 2.

After cotton has been removed from the plants by the picking fingers suitable cleaner members strip the same from the fingers 18 and 19 and deposit it upon endless conveyer belts 24 which extend from front to rear of the machine, one being positioned on each side of the arches 5. Being carried by the supplemental frames 6, the movement of the latter will also cause said conveyers to shift their positions. The direction of movement of the conveyers is obviously at right angles to the axis of rotation of the picking members 8 and from front to rear of the machine so that the cotton is deposited in suitable receptacles 25 at the rear of the frame 1.

The cleaning members for the picking disks 14 comprise the cylindrical rolls 9 journally mounted in the brackets 7 and disposed parallel to the shafts 12. These rolls 9 are geared or otherwise connected with the frames of the harvesting members 8 so as to rotate therewith. The cleaning fingers 26 of the rolls 9 project between the picking fingers 18 of the disks 14, but owing to the fact that the latter do not revolve when in the cleaning position, all likelihood of the fingers becoming engaged and bent out of position is obviated as hereinbefore mentioned.

The cleaning members for the fingers 19 of the other picking members 15 consist of brushes 27, one of which is disposed over each conveyer 24. As the picking members 15 revolve, the fingers 19 thereof are intermittently brought into engagement with said brushes and thereby cleaned.

It is also advisable to provide means for varying the distance between the harvesting members and the ground as well as the distance between said members, therefore the frame 1 and parts mounted thereon is movable vertically with respect to the wheels 2. This adjustment is carried out by rotating the screws 28. Any specific form of sliding arrangement between the frame 1 and the wheels 2 may be employed in this connection.

From the foregoing description it will be seen that the invention substantially comprises two separate harvesting units, each of which is operable independently of the other, but which operate most efficiently in conjunction. In other words, the clutches 23 permit the rotation and operation of the harvesting and cleaning members on either side of the arches 5 without similar movement of the parts on the other side. Similarly, the supplemental frame on one side of the arches may be moved without movement of that on the other side. However, the two units ordinarily operate together so that the picking fingers of each harvesting member will operate simultaneously upon the opposite sides of the rows of cotton plants.

I claim:—

1. In a machine of the class described, a support, a shaft carried thereby, a frame revoluble about the shaft, picker members carried by the frame and rotatable therewith, each of said members comprising a substantially flat disk, an annular series of fingers projecting from one face of the disk, means for rotating the disk in planes parallel to the axis of rotation of the frame, and means for cleaning said fingers.

2. In a machine of the class described, a supporting frame adapted to be moved in one direction with respect to the ground, a picking frame carried by the supporting frame, a plurality of picker members on the picking frame, each comprising a flat disk, an annular series of fingers projecting from one face of each disk, means for rotating the disks in planes parallel to the plane of the direction of movement of the supporting frame, and means for cleaning the fingers.

3. In a machine of the class described, a supporting frame, a revoluble harvesting member journally carried by said frame, a supplemental frame slidable on the supporting frame, a revoluble harvesting member carried by the supplemental frame, means for moving said supplemental frame on the supporting frame to adjust the last mentioned harvesting member with respect to the other harvesting member, and means for rotating said harvesting members.

4. In a machine of the class described, a supporting frame, a pair of supplemental frames slidable toward and away from each other on the supporting frame, a revoluble harvesting member carried by each of said supplemental frames, means for moving said supplemental frames to and from each other to adjust the distance between said harvesting members, and means for rotating said harvesting members.

5. In a machine of the class described, a supporting frame, a pair of supplemental frames slidable toward and away from each other on the supporting frame, a harvesting member carried by each of said supplemental frames, means for moving said supplemental frames to adjust the distance between said harvesting members, and means for cleaning said harvesting members.

6. In a machine of the class described, a supporting frame, a pair of supplemental frames slidable toward and away from each other on the supporting frame, a harvesting member carried by each of said supplemental frames, a rack carried by each supplemental frame, a pair of pinions on the supporting frame, each one of said pinions being meshed with its respective rack, means for rotating the pinions to vary the distance between said harvesting members, and means for cleaning said harvesting members.

In testimony that I claim the foregoing I have hereunto set my hand at Hudson, in the county of Saint Croix, and State of Wisconsin.

THOMAS M. OLSON.